United States Patent [19]

Goldman et al.

[11] Patent Number: 4,844,716
[45] Date of Patent: Jul. 4, 1989

[54] ENERGY RELEASING CATALYST AND USE THEREOF

[75] Inventors: Stuart O. Goldman, Scottsdale, Ariz.; Robert B. Pearson, Upper Saddle River, N.J.

[73] Assignee: Fuel Conservation Corporation, Ridgewood, N.J.

[21] Appl. No.: 261,778

[22] Filed: Oct. 24, 1988

[51] Int. Cl.$^4$ .................. C10L 1/14; C10L 1/30
[52] U.S. Cl. .......................... 44/68; 44/52; 44/57; 44/66
[58] Field of Search .............. 44/52, 57, 68, 66; 502/9

[56] References Cited

U.S. PATENT DOCUMENTS

| | | | |
|---|---|---|---|
| 2,560,542 | 7/1951 | Bartleson et al. | 44/68 |
| 2,890,108 | 6/1959 | Toulmin, Jr. | 44/68 |
| 3,078,662 | 2/1963 | Rocchini et al. | 44/68 |
| 3,205,053 | 9/1965 | McCord | 44/68 |
| 4,011,730 | 3/1977 | Rosenberg et al. | 44/52 |
| 4,180,384 | 12/1979 | Rice | 44/52 |
| 4,475,483 | 10/1984 | Robinson | 44/68 |
| 4,668,247 | 5/1987 | Berenyi | 44/68 |
| 4,752,302 | 6/1988 | Bowers et al. | 44/68 |

*Primary Examiner*—William R. Dixon, Jr.
*Assistant Examiner*—Margaret B. Medley
*Attorney, Agent, or Firm*—Richard R. Mybeck

[57] ABSTRACT

A catalyst/substrate delivery system providing a more efficient combustion of hydrocarbon fuels while reducing environmental pollutants emitting therefrom. A light hydrocarbon is misted into a cold environment to form frozen pellets which are then coated with plasma of an atomized catalyst such as platinum, palladium, lithium, zirconium organometals to form microspheres of from about 1 but less than 2000 microns in size.

6 Claims, 1 Drawing Sheet

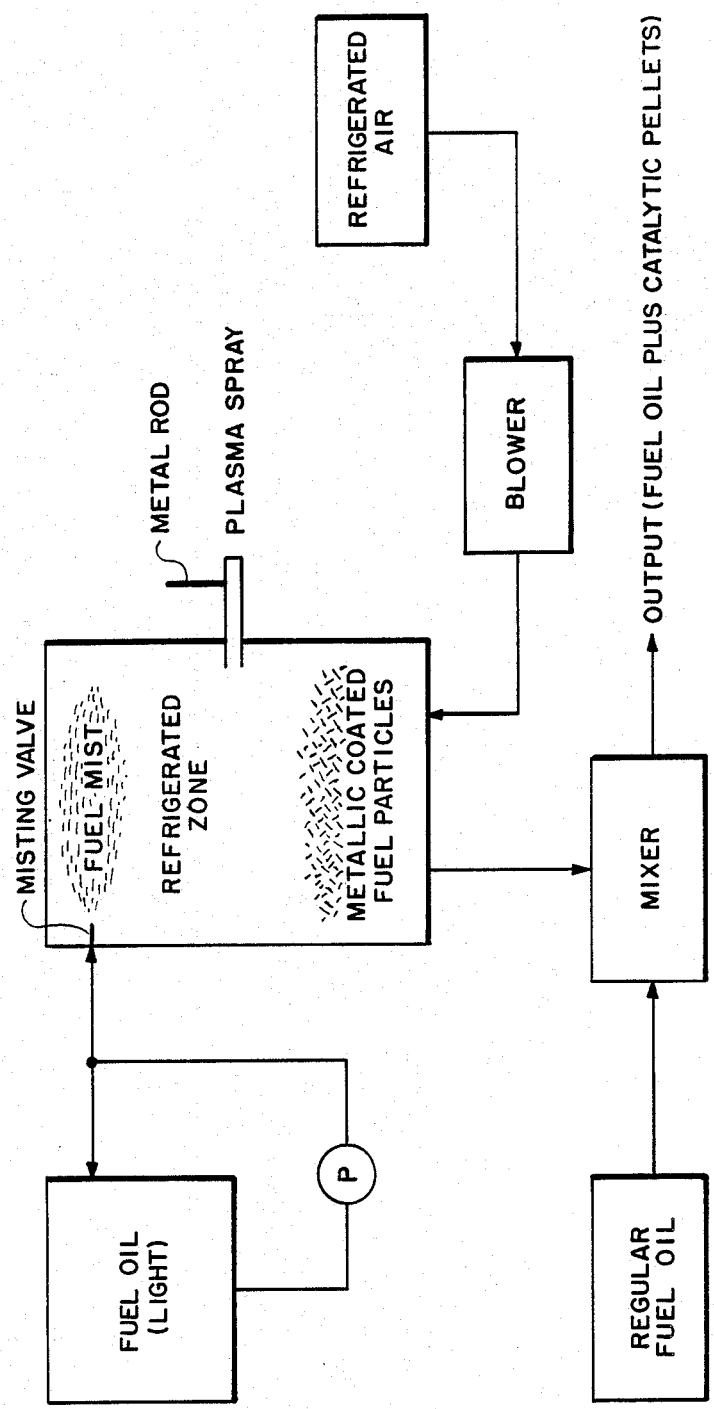

4,844,716

ENERGY RELEASING CATALYST AND USE THEREOF

INTRODUCTION

The present invention relates generally to catalytically enhanced hydrocarbon combustion and more particularly to means and methods for preparing and delivering a variety of catalysts on volatile substrates to maximize the energy release and reduce the undesirable byproducts from the combustion of hydrocarbon fuels.

BACKGROUND OF THE INVENTION

The use of energy releasing catalyst in the combustion of hydrocarbon fuels is known and, for example, is taught by Berenyi (U.S. Pat. No. 4,668,247) who discloses the use of a liposoluble organometallic compound combined in a diluent oil and further processed to form a solid substance which is thereafter added to hydrocarbon fuel prior to combustion, for example, in an internal combustion engine. Others have coated an inert substrate with the desired catalyst and passed the fuel over the catalyst/substrate at the time of combustion. The use of catalysis during hydrocarbon combustion has been shown to increase the energy output of the fuel and, because of the lower combustion temperature, lower the emission of the nitrogen oxides and carbon monoxides which are considered to be undesirable environmental pollutants.

The prior art preparation of catalytic agents has used inert substrates for catalyst support, and catalyst/substrate mixtures for combination with hydrocarbon fuels. While use of catalyst/substrate mixtures has demonstrated improved energy release, it is evident that such mixtures will result in fuel-catalyst separation in the long term which causes mechanical injector or needle valve clogging.

Thus, a need still exists for an improved catalyst/support or delivery systems for hydrocarbon combustion which systems have a small particle size which will remain in suspension due to its Brownian Movement, which has a specific gravity no greater than that of the hydrocarbon fuel, and a substrate which could be easily consumed in the combustion process. It is toward the provision of such a system that the present invention is directed.

BRIEF SUMMARY OF THE INVENTION

The present invention discloses a new and unique catalyst/substrate delivery system to obtain more efficient combustion of hydrocarbon fuels and at the same time, reduce the environmental pollutants emitting therefrom. The catalyst/substrate combination of the present invention has a particle size of greater than one micron but less than two thousand microns and is created by disposing particulate catalyst onto frozen substrate pellets formed of a preselected fuel to form microglobules having a specific gravity suitable for the intended use.

More particularly the present invention enables a proven catalyst to be delivered into a hydrocarbon fuel combustion chamber as mini-globules where it favorably influences the efficiency of the combustion reaction by the influences of the myriad of catalytic shards resulting from the explosion of each mini-globule. A further benefit results from the elimination of the inert substrate from the product of the combustion reaction.

Accordingly, a prime object of the present invention is to provide a new and improved catalyst delivery system for the combustion of hydrocarbons which eliminates the separate delivery and metering systems required by the prior art.

Another object of the present invention is to provide a new and improved catalytic delivery system for the combustion of hydrocarbons in which a lighter distillate of fuel oil is employed as the core of a micro-globule creating, when coated with the appropriate catalyst, a microsphere having a neutral buoyancy relative to the hydrocarbon fuel into which it is admixed.

A further object of the present invention is to provide unique means and methods for delivery catalyst to a hydrocarbon combustion reaction in which a frozen droplet of a hydrocarbon fuel is thereafter coated with catalyst to form a microsphere.

Still another object of the present invention is to provide a new and improved metallic catalytic agent which is expendable during combustion and leaves no contaminating residue.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

BRIEF DESCRIPTION OF THE DRAWINGS

In the drawing:

FIG. 1 is a schematic flow diagram of a process of preparing and using catalytic microspheres embodying the present invention.

DESCRIPTION OF THE PREFERRED EMBODIMENT

In one practice of the present invention, as illustrated by FIG. 1, a catalyst substrate is formed by the atomization of the selected hydrocarbon, such as kerosene, light fuel oil, diesel fuel, and the like into a cold atmosphere in which the spray is frozen. The selected hydrocarbon is chosen by its specific gravity which shall in any event not exceed and preferably be slightly less than the hydrocarbon whose combustion it will be used to promote. The frozen fuel pellets are then coated with a plasma of an atomized catalyst such as platinum, palladium, lithium, and zirconium organometals, and the like. There is no requirement for the catalyst to be soluble or partially soluble in the substrate. The frozen substrate absorbs the energy from the plasma process. Once the coating has formed, the pellet no longer needs to remain a solid. The catalyst/substrate combination is then collected and classified for further use. The classification process eliminates the broken particles and retains the particles measuring one to two thousand microns that have a formed catalyst shell around the now liquid hydrocarbon substrate center.

In use, the formed catalyst is injected into the fuel hydrocarbon just prior to ignition and the resulting explosion of the catalyst microsphere causes the catalyst coating to be dispersed as a myriad of catalytic shards at the moment of combustion. In an alternative embodiment, the formed catalyst microsphere can be mixed directly into and with the hydrocarbon fuel because the small micron sized microsphere has been deliberately formed using a hydrocarbon core which has a specific gravity suitable to insure that the finished frozen microsphere has a neutral buoyancy when suspended in the normal hydrocarbon fuel employed for combustion. In this manner, normal molecular or Brownian movement will maintain the catalytic microspheres suspended within the incoming fuel.

The promised reduction in environmental pollutants such as the oxides of nitrogen and carbon monoxide is a direct result of the more efficient combustion and the lowered ignition temperature facilitated by the presence of the catalyst in the chamber at the time of burning.

It is thus apparent that means and methods are described herein which provide more complete combustion and hence a greater energy release from a given amount of fuel while substantially reducing the number of pollutants generated therefrom.

The exact benefit achieved will vary from run to run although it has been determined that the magnitude of the energy gain, when compared to conventional combustion without catalyst, will be governed by the catalyst employed to coat the frozen globules, the size of the microspheres, and the number of the microspheres dispersed per unit volume of the fuel being burned.

Other economic benefit is obtained by using the frozen oil mist as a substrate which, when coated as herein described, produces a very fine catalytic product without the expense of grinding and the potential problems resulting from a dispersion of inert substrate through the combustion chamber.

As the catalytic microspheres, formed as described above, enter into the combustion zone, the full core superheats, forms a gas under pressure, and explodes the catalytic coating formed thereabout into a myriad of tiny shards which effectively multiplies the effective surface area by a factor substantially greater than the two obtainable by allowing combustion site access to both sides of the film.

From the foregoing, it is readily apparent that means and methods have been herein described and illustrated which fulfill all of the aforestated objects in a remarkably unexpected fashion. It is of course understood that such modifications, alterations and adaptations as may readily occur to an artisan having ordinary skill in the art to which this disclosure pertains when confronted hereby are intended within the spirit of the present invention which is limited only by the scope of the claims appended hereto.

Accordingly what is claimed is:

1. A method of producing a catalytic charge for use in facilitating the efficiency of hydrocarbon fuel combustion while reducing the quantity of environmental pollutants resulting therefrom, said method comprising the steps of: passing light fuel oil through a misting valve into a refrigerated area to form a plurality of minute frozen oil pellets; spraying said pellet with the plasma of a catalyst selected from the group consisting of platinum, palladium, lithium and zirconium organometals and mixtures thereof to form a coated microsphere; and collecting said coated microspheres for subsequent introduction with a hydrocarbon fuel into a hydrocarbon combustion chamber.

2. A method of producing a catalytic charge according to claim 1 in which said pellets are at least 1 but less than 2000 microns in diameter.

3. A method according to claim 1 in which said microspheres contain a liquid hydrocarbon center.

4. A method according to claim 2 in which said microspheres contain a liquid hydrocarbon center.

5. A method of enhancing the efficiency of hydrocarbon fuel combustion while reducing the emission of environmental pollutants therefrom comprising introducing a hydrocarbon fuel into a combustion chamber concurrently with a plurality of microspheres having a plasma coated catalytic shell in circumscription about a liquid center of light fuel oil; heating said microspheres to vaporize said center and explode said microsphere to disperse a plurality of catalytic shards throughout said hydrocarbon fuel and enhance the combustion thereof.

6. A method according to claim 5 in which said microspheres have a neutral buoyancy when suspended in said hydrocarbon fuel.

* * * * *